United States Patent
Liu et al.

(10) Patent No.: US 11,112,684 B2
(45) Date of Patent: Sep. 7, 2021

(54) PROJECTION APPARATUS WITH ILLUMINATION SYSTEM HAVING PLURALITY OF LASER MODULES

(71) Applicant: Coretronic Corporation, Hsin-Chu (TW)

(72) Inventors: Hung-Wei Liu, Hsin-Chu (TW); Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 4 days.

(21) Appl. No.: 16/691,619

(22) Filed: Nov. 22, 2019

(65) Prior Publication Data

US 2020/0174355 A1 Jun. 4, 2020

(30) Foreign Application Priority Data

Nov. 30, 2018 (CN) .......................... 201811455576.1

(51) Int. Cl.
 *G03B 21/20* (2006.01)
(52) U.S. Cl.
 CPC ....... *G03B 21/2013* (2013.01); *G03B 21/204* (2013.01); *G03B 21/208* (2013.01)
(58) Field of Classification Search
 CPC ............ G02B 21/2013; G02B 21/2033; F21Y 2115/30; G03B 21/2013; G03B 21/2033
 See application file for complete search history.

(56) References Cited

U.S. PATENT DOCUMENTS

| 5,700,076 | A | * | 12/1997 | Minich | .............. | G02B 27/0927 348/771 |
| 6,431,731 | B1 | * | 8/2002 | Krietzman | .............. | H01S 3/005 359/28 |
| 7,261,453 | B2 | * | 8/2007 | Morejon | ............ | G02B 27/0994 353/31 |
| 7,369,316 | B2 | * | 5/2008 | Shanley | ............... | H04N 9/3152 257/E25.02 |
| 7,871,165 | B2 | * | 1/2011 | Silverstein | ......... | G02B 27/0905 353/7 |
| 8,042,950 | B2 | * | 10/2011 | Hazama | ............... | H04N 9/3161 353/30 |

(Continued)

FOREIGN PATENT DOCUMENTS

| CN | 102375315 | 3/2012 |
| CN | 105093794 | 11/2015 |

(Continued)

OTHER PUBLICATIONS

"Office Action of China Counterpart Application", dated Jan. 29, 2021, p. 1-p. 10.

*Primary Examiner* — Ismael Negron
(74) *Attorney, Agent, or Firm* — JCIPRNET

(57) ABSTRACT

A projection apparatus including a projection lens, a light valve module, and an illumination system optically coupled to produce an image beam is provided. The illumination system further includes a plurality of first laser source modules adapted to emit a plurality of first laser beams, and a diffusion component disposed on transmission paths of the plurality of first laser beams, such that the plurality of first laser beams form a plurality of light spots at a plurality of locations on the diffusion component.

23 Claims, 13 Drawing Sheets

(56) References Cited

U.S. PATENT DOCUMENTS

| | | | | |
|---|---|---|---|---|
| 8,591,040 B2* | 11/2013 | Young | ............... | H04N 9/3155 |
| | | | | 353/84 |
| 8,616,706 B2* | 12/2013 | Miura | ............... | G02B 19/0028 |
| | | | | 353/38 |
| 8,905,548 B2* | 12/2014 | Fan | ............... | G03B 21/20 |
| | | | | 353/31 |
| 9,116,421 B1* | 8/2015 | Rutherford | ............... | H04N 9/3152 |
| 9,274,404 B2* | 3/2016 | Yamaguchi | ............... | G03B 5/02 |
| 2010/0296533 A1* | 11/2010 | Silverstein | ............... | G02B 27/48 |
| | | | | 372/29.02 |
| 2011/0075108 A1* | 3/2011 | Kojima | ............... | G03B 21/2033 |
| | | | | 353/38 |

FOREIGN PATENT DOCUMENTS

| | | |
|---|---|---|
| CN | 105137610 | 12/2015 |
| CN | 105492968 | 4/2016 |
| CN | 209373338 | 9/2019 |
| EP | 3051344 | 8/2016 |
| TW | 201516555 | 5/2015 |

* cited by examiner

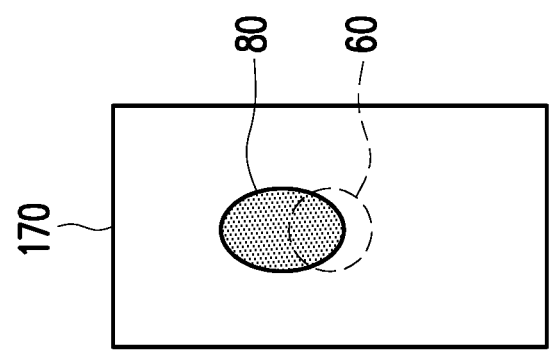

PROJECTION APPARATUS WITH ILLUMINATION SYSTEM HAVING PLURALITY OF LASER MODULES

CROSS-REFERENCE TO RELATED APPLICATION

This application claims the priority benefit of China application serial no. 201811455576.1, filed on Nov. 30, 2018. The entirety of the above-mentioned patent application is hereby incorporated by reference herein and made a part of this specification.

BACKGROUND OF THE INVENTION

Field of the Invention

The invention relates to an optical system and an optical apparatus, and more particularly, to an illumination system and a projection apparatus adopting the illumination system.

Description of Related Art

With the development of optical techniques, solid-state lighting techniques such as light-emitting diode (LED) and laser diode (LD) have become more and more popular in the light source of a projector, wherein the LD may provide a beam with higher intensity as a light source of the projector than the LED. Therefore, a pure color source needed for the projector generated by exciting a phosphor with a laser source has been gradually developed. In addition, the laser projection apparatus not only may use the laser source to excite the phosphor to emit light, but may also directly use the laser as the projector light source, and has the advantage of adjusting the number of the light source according to brightness requirement, so as to achieve the projector requirements of various brightnesses.

However, as the output brightness requirements of the laser projector are gradually increased, the laser power inputted must also be increased. As the number of the laser source is increased, a larger lens is required to direct all of the laser beams to the internal optical device, such that the optical path of the laser beam may become longer, which results in a bulky overall size. In addition, when the laser energy intensity is too concentrated, the internal optical device may be burned, or the service life of the internal optical device may be shortened.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides an illumination system and a projection apparatus that have smaller size and longer service life.

Other objects and advantages of the invention may be further understood from the technical features disclosed by the invention.

In order to achieve one or a portion or all of the above or other objects, an embodiment of the invention provides an illumination system including a plurality of first laser source modules and a diffusion component. The plurality of first laser source modules are adapted to emit a plurality of first laser beams. The diffusion component is disposed on transmission paths of the plurality of first laser beams, wherein the plurality of first laser beams form a plurality of light spots at a plurality of locations on the diffusion component.

In order to achieve one or a portion or all of the above or other objects, an embodiment of the invention provides a projection apparatus including the above illumination system, a light valve module, and a projection lens. The illumination system is adapted to emit an illumination beam. The light valve module is disposed on a transmission path of the illumination beam to modulate the illumination beam into an image beam. The projection lens is disposed on a transmission path of the image beam.

Based on the above, in the illumination system of the embodiment of the invention, the illumination system includes a plurality of first laser source modules, and a plurality of first laser beams emitted from the plurality of first laser source modules form a plurality of light spots at a plurality of locations on the diffusion component. That is to say, by separately disposing the plurality of first laser source modules, the plurality of first laser beams are not concentratedly irradiated to the same location of the diffusion component, so that a larger lens is not required to converge the plurality of first laser beams to the same location, and the optical path may be reduced, so that a smaller size may be achieved. In addition, the plurality of first laser beams are dispersedly irradiated to different locations of the diffusion component, which may reduce the energy density on the diffusion component to avoid burning the diffusion component, and thus a longer service life may be achieved. The projection apparatus of the embodiment of the invention includes the above illumination system, and thus a smaller size and a longer service life may be achieved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7B is a front view of the light-homogenizing component in FIG. 7A.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
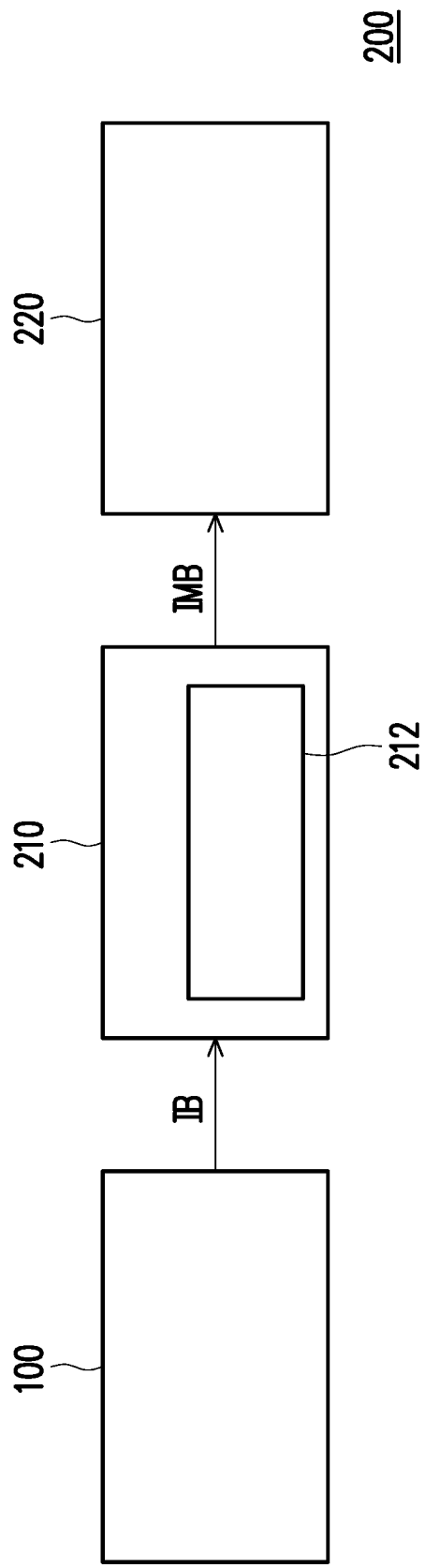
FIG. 1 is a schematic view of a projection apparatus according to an embodiment of the invention.

FIG. 1 is a schematic view of a projection apparatus according to an embodiment of the invention. Referring to FIG. 1, a projection apparatus 200 of the present embodiment includes an illumination system 100, an optical engine 210, and a projection lens 220. The illumination system 100 is adapted to emit an illumination beam IB. The optical engine 210 is disposed on the transmission path of the illumination beam IB to modulate the illumination beam IB into an image beam IMB. The projection lens 220 is disposed on the transmission path of the image beam IMB and is adapted to project the image beam IMB onto a screen or a wall (not shown) to form an image.

The optical engine 210 may include a light valve module 212, wherein the number of light valves in the light valve module 212 may be one or more. After the illumination beam IB of different colors are irradiated on the light valve module 212, the light valve module 212 converts the illumination beam IB of different colors into the image beam IMB according to a time sequence and transmits the image beam IMB to the projection lens 220. Therefore, the image formed by projecting the image beam IMB converted by the light valve module 212 out of the projection apparatus 200 may be a color image. In addition, the optical engine 210 may also include a plurality of optical components to adjust the internal beam path.

In the present embodiment, the light valve in the light valve module 212 is, for example, a digital micro-mirror device (DMD), a liquid-crystal-on-silicon (LCOS) panel, a liquid crystal display (LCD), or other spatial light modulators. In the present embodiment, the projection lens 220 includes, for example, a combination of one or a plurality of optical lenses having a diopter, and the optical lens includes, for example, a non-flat lens such as a biconcave lens, a bioconvex lens, a convex-concave lens, a convex-concave lens, a plano-convex lens, a plano-concave lens, and the like, or various combinations thereof. The invention does not limit the configuration and the type of the projection lens 220.

Various embodiments of the illumination system 100 of the present embodiment are described in detail in the following paragraphs, wherein the illumination system 100 may be any one of an illumination system 100a to an illumination system 100g in the following first to seventh embodiments.

Figure 2:
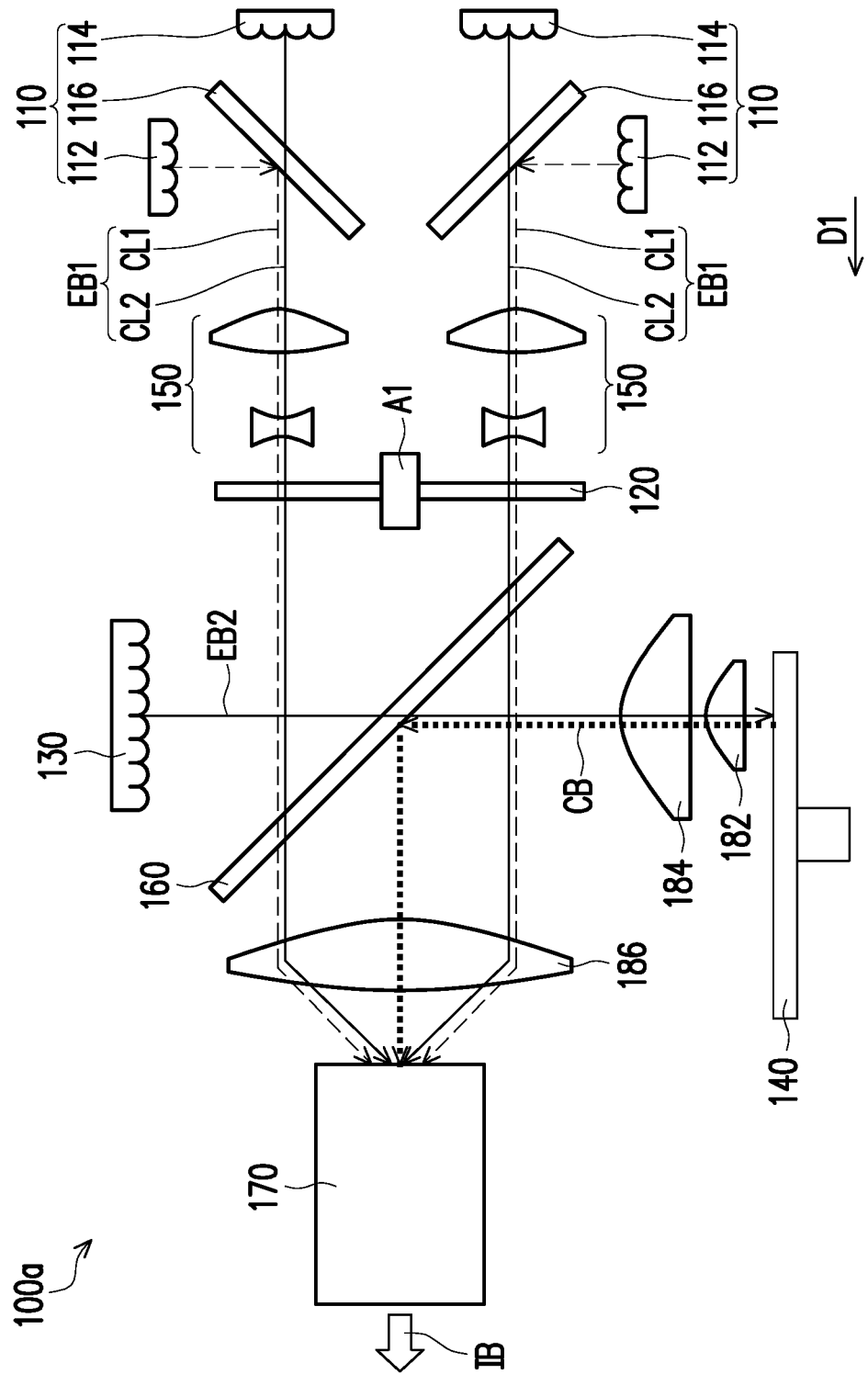
FIG. 2 is a schematic view of an illumination system according to the first embodiment of the invention.

FIG. 2 is a schematic view of an illumination system according to the first embodiment of the invention. FIG. 3A is a front view of the diffusion component in FIG. 2. In addition, FIG. 3A also schematically shows light spots formed when a plurality of first laser beams are irradiated onto the diffusion component.

Referring to FIG. 2 and FIG. 3A, the illumination system 100a of the present embodiment is adapted to emit the illumination beam IB. The illumination system 100a includes a plurality of first laser source modules 110 and a diffusion component 120. The plurality of first laser source modules 110 are adapted to emit a plurality of first laser beams EB1. The diffusion component 120 is disposed on the transmission path of the plurality of first laser beams EB1, wherein the plurality of first laser beams EB1 form a plurality of light spots 50 (shown in FIG. 3A) at a plurality of locations on the diffusion component 120. Further, when the plurality of first laser beams EB1 are incident to the diffusion component 120, traveling directions D1 of the plurality of first laser beams EB1 are parallel to each other, wherein the traveling directions D1 are, for example, the directions that go from right to left in FIG. 2.

Specifically, in the present embodiment, each of the first laser source modules 110 includes a first laser source 112, a second laser source 114, and a light-combining unit 116. The first laser source 112 is adapted to emit a first color beam CL1. The second laser source 114 is adapted to emit a second color beam CL2. The first laser source 112 and the second laser source 114 are disposed at two opposite sides of the light-combining unit 116. The light-combining unit 116 is disposed on the transmission paths of the first color beam CL1 and the second color beam CL2, and the light-combining unit 116 combines the first color beam CL1 and the second color beam CL2 into one of the first laser beams EB1. It should be noted that in FIG. 2 (and subsequent FIG.

6A, FIG. 7A, FIG. 8, FIG. 9, and FIG. 10), the combined first color beam CL1 and second color beam CL2 are depicted as being slightly separated to clearly show the transmission path of each color beam. However, the combined first color beam CL1 and second color beam CL2 are actually transmitted along the same or substantially the same transmission path.

In the present embodiment, the first laser source 112 and the second laser source 114 are generally referred to as a light source capable of emitting a laser beam, and the peak wavelength of the laser beam is, for example, within the wavelength range of red light, the wavelength range of blue light, or the wavelength range of ultraviolet, wherein the peak wavelength is defined as the wavelength corresponding to the maximum light intensity. The first laser source 112 and the second laser source 114 each include a laser diode (LD), a light-emitting diode (LED), or an array or a group of one of the two above, and the invention is not limited thereto. In the present embodiment, each of the first laser source 112 and the second laser source 114 is a laser light-emitting component including a laser diode. For example, the first laser source 112 may be, for example, a red laser diode bank, the first color beam CL1 is a red laser beam, the second laser source 114 may be, for example, a blue laser diode bank, and the second color beam CL2 is a blue laser beam, but the invention is not limited thereto.

The light-combining unit 116 may be a dichroic unit, such as a dichroic mirror (DM) or a dichroic prism, and may provide different optical effects on beams of different colors. Specifically, the light-combining unit 116 can, for example, allow blue beam to pass through and reflect beams of other colors (such as red, green, or yellow). In the present embodiment, the light-combining unit 116 may be designed to allow the second color beam CL2 to pass through and reflect the first color beam CL1. Therefore, the light-combining unit 116 may combine the first color beam CL1 from the first laser source 112 and the second color beam CL2 from the second laser source 114 and transmit them to the diffusion component 120.

Referring to FIG. 3A, the diffusion component 120 of the present embodiment is a rotatable disk-shaped component. The diffusion component 120 includes a substrate S1 and a central axis A1. The substrate S1 is, for example, a light-transmitting substrate, and is provided with a diffusion sheet, diffusion particles, or a diffusion structure for reducing or eliminating a speckle phenomenon of the first laser beams EB1. In the present embodiment, the diffusion component 120 is adapted to rotate around the central axis A1, so that the thermal energy generated by the first laser beams EB1 on the diffusion component 120 is more homogenous to avoid cracking or burning of the diffusion component 120. However, in other embodiments, the diffusion component 120 may be a fixed diffusion plate, and the shape of the diffusion component 120 may be other shapes.

Figure 3B:
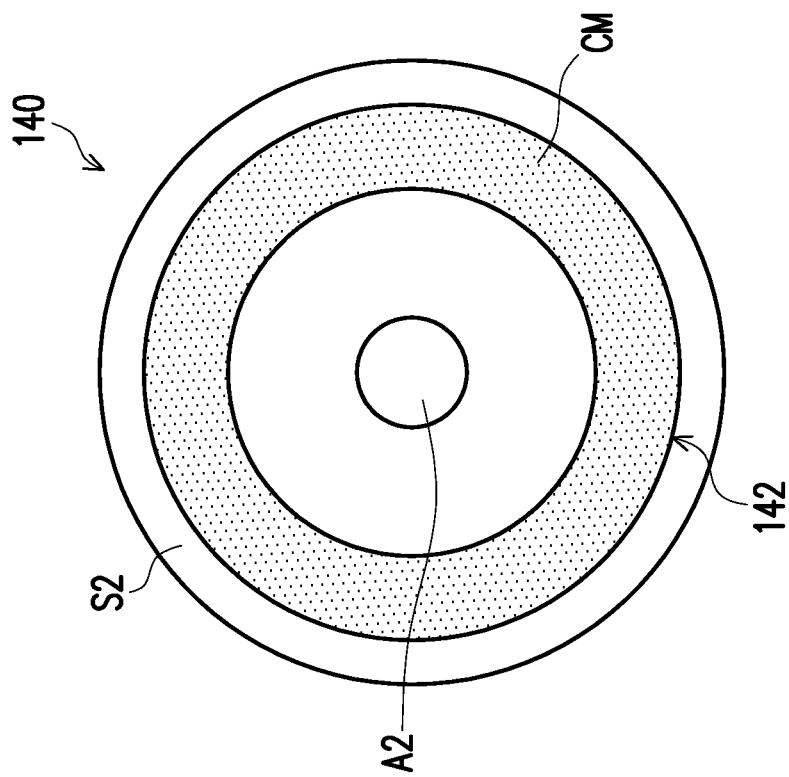
FIG. 3B is a front view of the wavelength conversion component in FIG. 2.
Figure 3A:
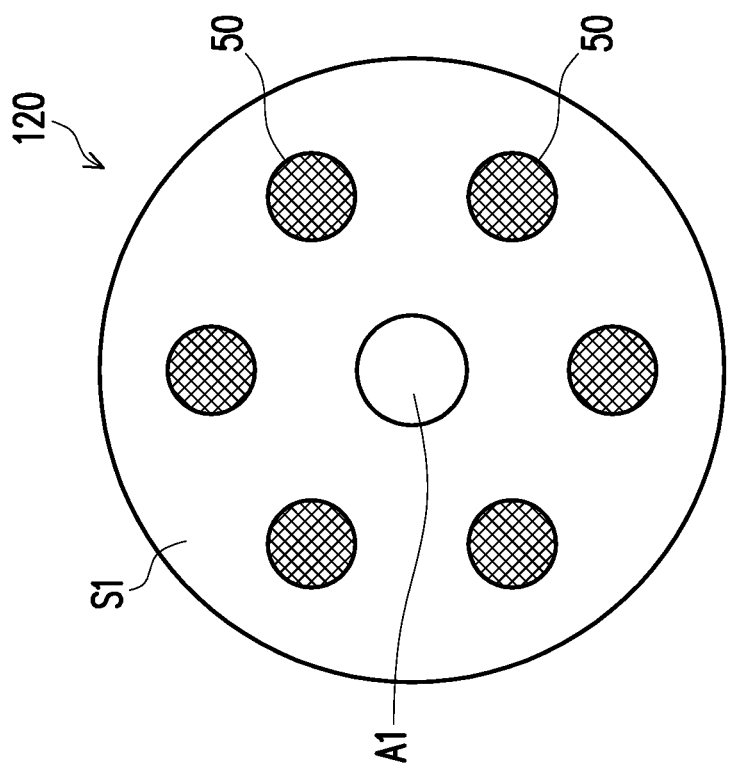
FIG. 3A is a front view of the diffusion component in FIG. 2.
Figure 3C:
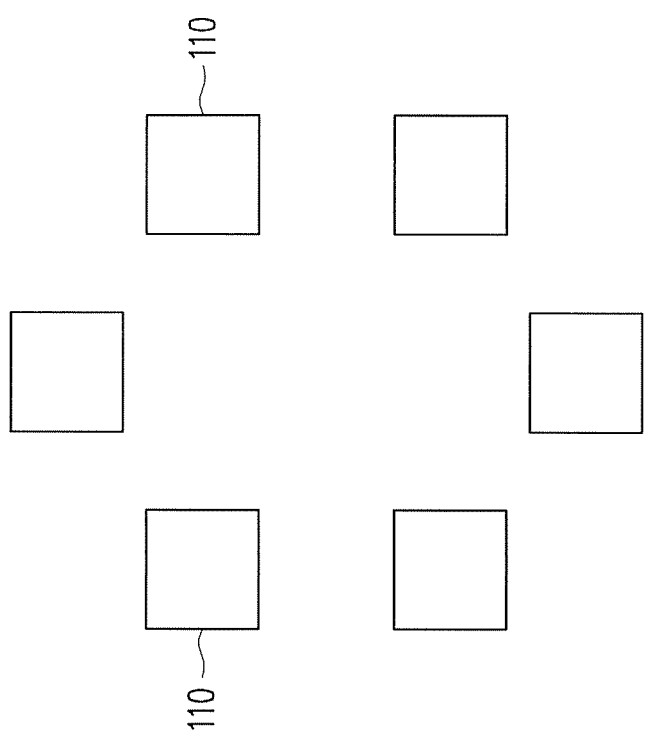
FIG. 3C is a schematic diagram of a plurality of first laser source modules.

In the present embodiment, the plurality of first laser source modules 110 are arranged in a ring shape such that the plurality of light spots 50 are arranged in a ring shape, as shown in FIG. 3C, but the invention is not limited thereto. In other embodiments, the plurality of light spots 50 may also be arranged in an array or randomly distributed on the diffusion component 120. In addition, the number of the plurality of first laser source modules 110 of the present embodiment is six as an example, and thus there are six corresponding light spots 50 on the diffusion component 120, but the invention is not limited thereto. In other embodiments, the number of the plurality of first laser source modules 110 may also be two, three, or other numbers.

In the present embodiment, by separately disposing the plurality of first laser source modules 110, the plurality of first laser beams EB1 are not concentratedly irradiated to the same location of the diffusion component 120, so that a larger lens is not required to converge the plurality of first laser beams EB1 to the same location, and the optical path may be reduced, so that a smaller size may be achieved. In addition, the plurality of first laser beams EB1 are dispersedly irradiated to different locations of the diffusion component 120, which may reduce the energy density on the diffusion component 120 to avoid burning the diffusion component 120, and thus a longer service life may be achieved.

FIG. 3B is a front view of the wavelength conversion component in FIG. 2. Referring to FIG. 2 and FIG. 3B simultaneously, the illumination system 100a of the present embodiment further includes a second laser source module 130 and a wavelength conversion component 140. The second laser source module 130 is adapted to emit a second laser beam EB2. The wavelength conversion component 140 is disposed on the transmission path of the second laser beam EB2, and the wavelength conversion component 140 is adapted to convert the second laser beam EB2 into a converted beam CB.

In the present embodiment, the wavelength conversion component 140 is a rotatable disk-shaped component, such as a phosphor wheel. Specifically, the wavelength conversion component 140 includes a substrate S2 and a central axis A2, the substrate S2 is, for example, a reflective substrate, and the substrate S2 has a wavelength conversion region 142 that is ring-shaped. The drive component of the wavelength conversion component 140 drives the central axis A2 such that the wavelength conversion region 142 is cut into the transmission path of the second laser beam EB2 in a rotational manner. A wavelength conversion substance CM is disposed inside the wavelength conversion region 142, and the wavelength conversion substance CM is, for example, a yellow phosphor. The wavelength conversion component 140 converts the short-wavelength beam transmitted to the wavelength conversion region 142 into a long-wavelength beam. In the present embodiment, when the wavelength conversion region 142 is cut into the transmission path of the second laser beam EB2, the second laser beam EB2 is converted into the converted beam CB by the wavelength conversion region 142, and the converted beam CB is reflected by the substrate S2. The converted beam CB is, for example, a yellow beam. In other embodiments, the wavelength conversion component 140 may also include a plurality of wavelength conversion regions that respectively convert the first laser beams EB1 into different color lights.

In the present embodiment, the second laser source module 130 is similar to the second laser source 114 and is not repeated herein. The second laser source module 130 is, for example, a blue laser diode bank, and the second laser beam EB2 is a blue laser beam, but the invention is not limited thereto. In addition, the wavelength of the second laser beam EB2 emitted from the second laser source module 130 may be the same as the wavelength of the second laser source 114 or may be different from the wavelength of the second laser source 114.

Referring to FIG. 2 again, the illumination system 100a of the present embodiment further includes a plurality of lens modules 150, a light-combining component 160, and a light-homogenizing component 170. The plurality of lens modules 150 are located between the plurality of first laser source modules 110 and the diffusion component 120 and are respectively disposed on the transmission paths of the plurality of first laser beams EB1. The plurality of lens modules 150 are adapted to adjust the light paths of the plurality of first laser beams EB1. The light-combining component 160 is disposed between the second laser source module 130 and the wavelength conversion component 140, and is disposed on the transmission paths of the plurality of first laser beams EB1 from the diffusion component 120, the second laser beam EB2 from the second laser source module 130, and the converted beam CB from the wavelength conversion component 140. The light-combining component 160 may be a dichroic unit, such as a dichroic mirror (DM) or a dichroic prism, and may provide different optical effects on beams of different colors. Specifically, the light-combining component 160 can, for example, allow blue beam and red beam to pass through and reflect beams of other colors (such as green or yellow). In the present embodiment, the light-combining component 160 may be designed to allow the first laser beams EB1 and the second laser beam EB2 to pass through and reflect the converted beam CB. Therefore, the light-combining component 160 may transmit the second laser beam EB2 from the second laser source module 130 to the wavelength conversion component 140, and after the wavelength conversion component 140 reflects the converted beam CB back to the light-combining component 160, the light-combining component 160 may combine the converted beam CB from the wavelength conversion component 140 and the plurality of first laser beams EB1 from the first laser source modules 110 and transmit them to the light-homogenizing component 170 to form the illumination beam IB for output.

The light-homogenizing component 170 refers to an optical component that may homogenize the beam passing through the light-homogenizing component 170. In the present embodiment, the light-homogenizing component 170 is disposed on the transmission paths of the converted beam CB and the plurality of first laser beams EB1 from the light-combining component 160. The light-homogenizing component 170 is, for example, an integration rod. In other embodiments, the light-homogenizing component 170 may also be a lens array or other optical components having a light-homogenizing effect.

In addition, the illumination system 100a may further include one or a plurality of lenses, such as a lens 182 and a lens 184 located between the light-combining component 160 and the wavelength conversion component 140, or a lens 186 located between the light-combining component 160 and the light-homogenizing component 170 to adjust the beam path inside the illumination system 100a.

It is to be noted that the following embodiments use parts of the foregoing embodiments, and the description of the same technical content is omitted. For the same component names, reference may be made to parts of the foregoing embodiments and are not repeated in the following embodiments.

Figure 4:
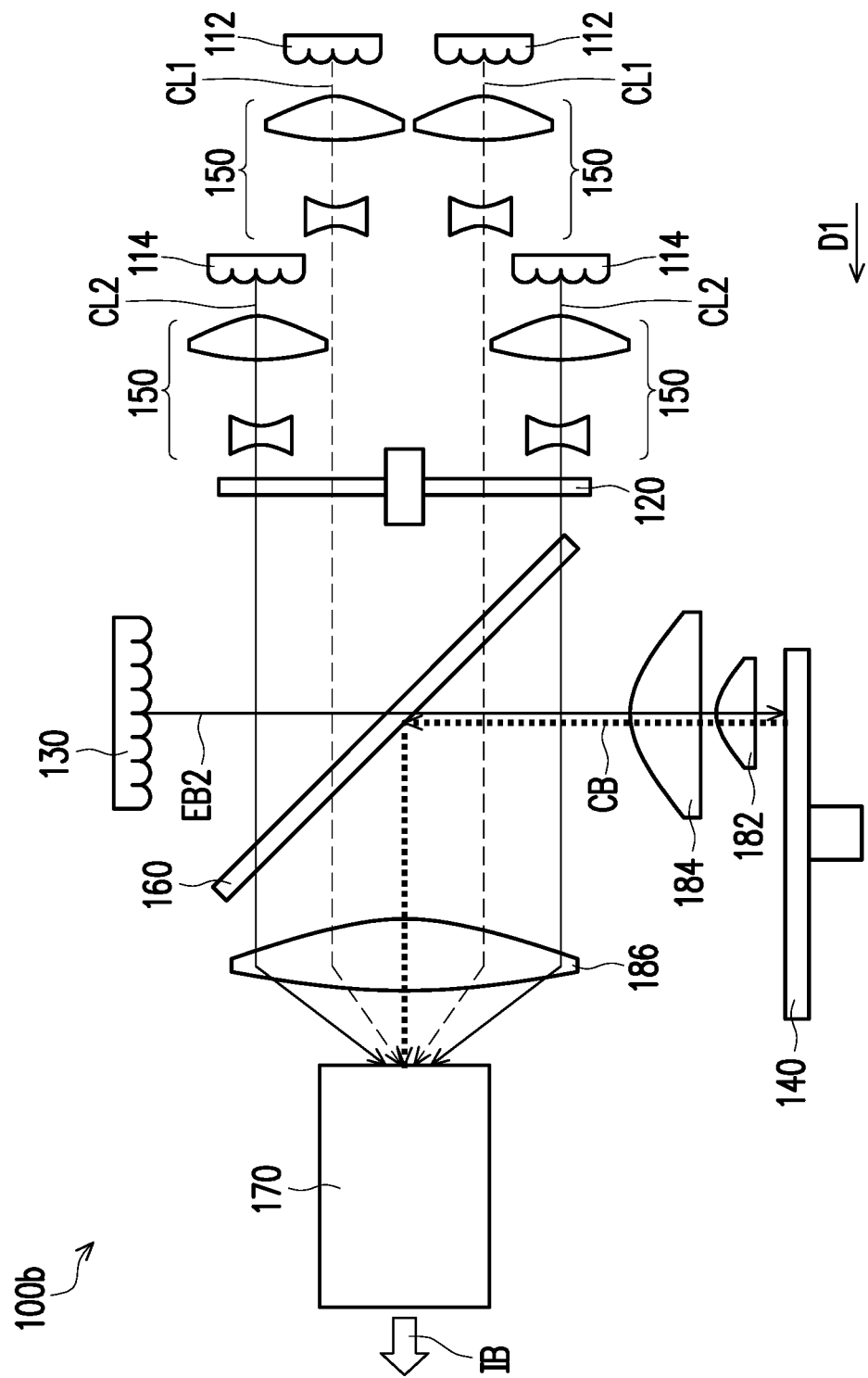
FIG. 4 is a schematic view of an illumination system according to the second embodiment of the invention.
Figure 5:
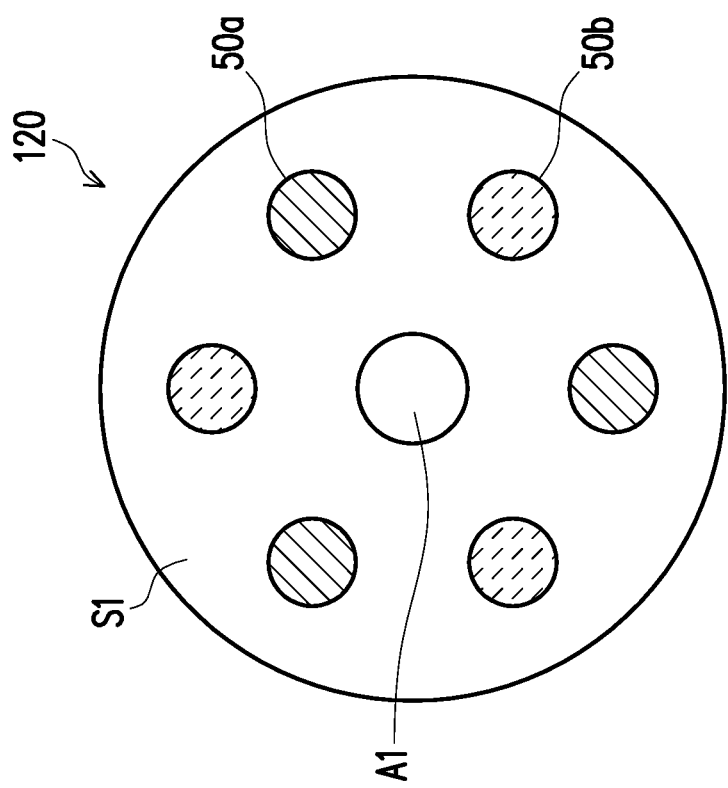
FIG. 5 is a front view of the diffusion component in FIG. 4.

FIG. 4 is a schematic view of an illumination system according to the second embodiment of the invention. FIG. 5 is a front view of the diffusion component in FIG. 4. In addition, FIG. 5 also schematically shows light spots formed when a plurality of first laser beams are irradiated onto the diffusion component.

Referring first to FIG. 4, the illumination system 100b of the present embodiment is similar to the illumination system 100a of the first embodiment, and the main difference in architecture thereof is the architecture of the first laser source modules. In the present embodiment, first laser source modules 110a include at least one first laser source 112 and at least one second laser source 114. The at least one first laser source 112 is adapted to emit at least one first color beam CL1, the at least one second laser source 114 is adapted to emit at least one second color beam CL2, and the plurality of first laser beams EB1 include at least one first color beam CL1 and at least one second color beam CL2.

In the present embodiment, the first laser source 112 may be, for example, a red laser diode bank, the first color beam CL1 is a red laser beam, the second laser source 114 may be, for example, a blue laser diode bank, and the second color beam CL2 is a blue laser beam, but the invention is not limited thereto.

Referring to FIG. 5, in the present embodiment, the first laser sources 112 and the second laser sources 114 respectively form light spots 50a and light spots 50b on the diffusion component 120. In the present embodiment, the first laser sources 112 and the second laser sources 114 are arranged in a ring shape, and the light spots 50a and the light spots 50b are arranged in a ring shape, but the invention is not limited thereto. In other embodiments, the light spots 50a and the light spots 50b may also be arranged in an array or randomly distributed on the diffusion component 120. In addition, the numbers of the first laser sources 112 and the second laser sources 114 in the present embodiment are respectively three as an example, and therefore there are three corresponding light spots 50a and three corresponding light spots 50b on the diffusion component 120. However, the invention is not limited thereto. In other embodiments, the number of the first laser sources 112 or the second laser sources 114 may be one, two, or other numbers. Moreover, the number of the first laser sources 112 and the second laser sources 114 may be the same or different. In addition, the arrangement of the first laser sources 112 and the second laser sources 114 may be alternated with each other or may be randomly arranged.

Figure 6A:
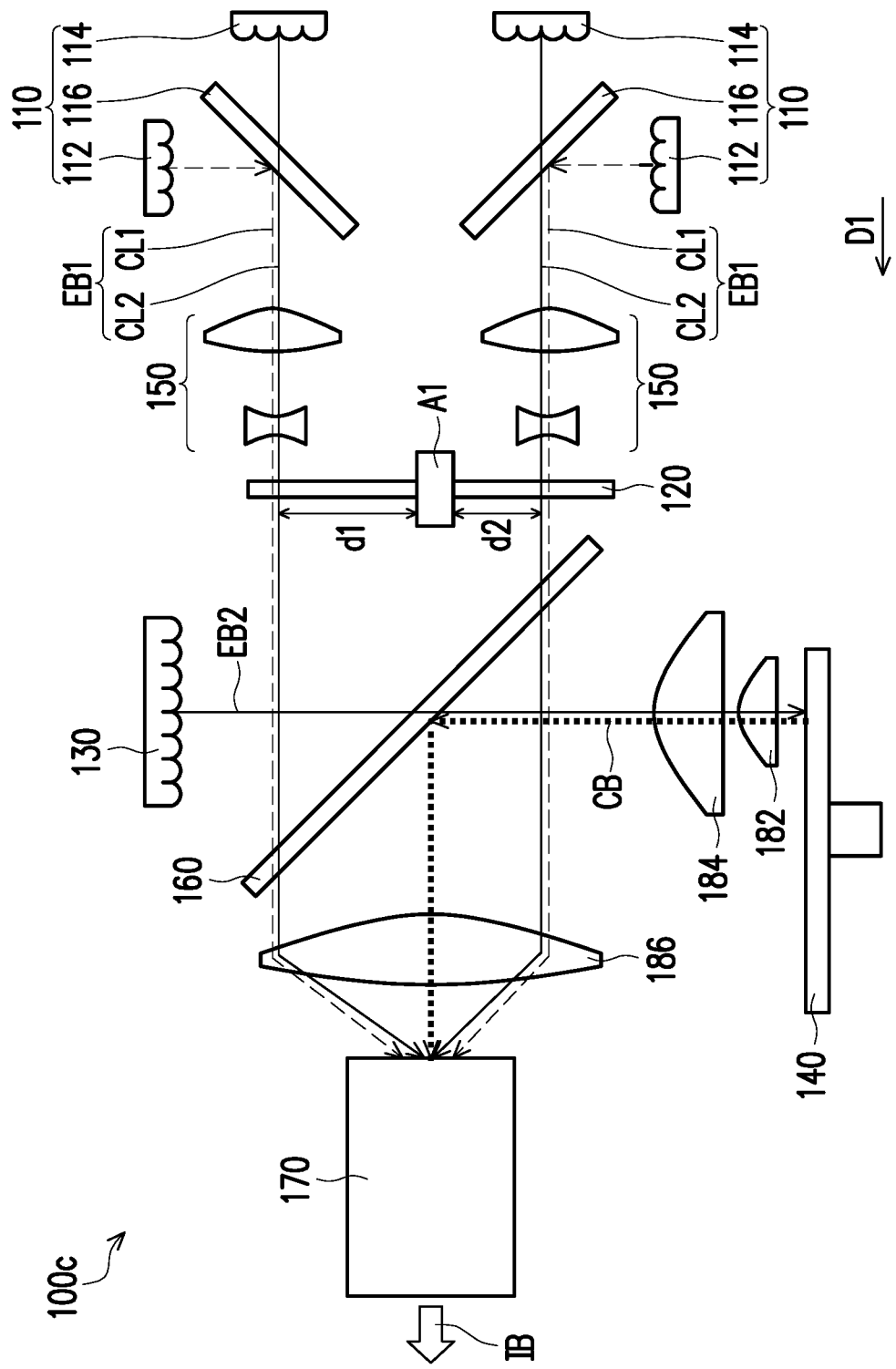
FIG. 6A is the schematic view of an illumination system according to the third embodiment of the invention.
Figure 6B:
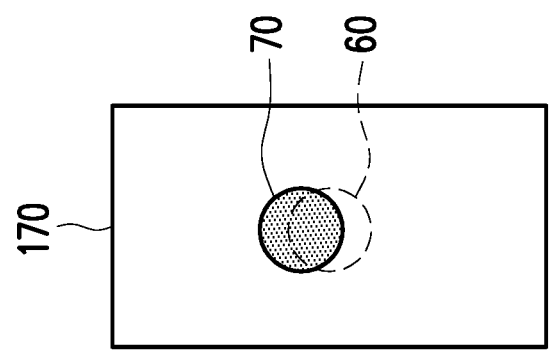
FIG. 6B is a front view of the light-homogenizing component in FIG. 6A.

FIG. 6A is a schematic view of an illumination system according to the third embodiment of the invention. FIG. 6B is a front view of the light-homogenizing component in FIG. 6A. In addition, FIG. 6B also schematically shows a light spot formed when a plurality of first laser beams are irradiated onto the light-homogenizing component.

Referring first to FIG. 6A, the illumination system 100c of the present embodiment is similar to the illumination system 100a of the first embodiment, and the main difference in architecture thereof is the locations of the plurality of first laser source modules 110 with respect to the central axis A1 of the diffusion component 120. In the present embodiment, the distances of at least two of the plurality of light spots 50 formed by the plurality of first laser beams EB1 on the diffusion component 120 from the central axis A1 of the diffusion component 120 are different. For example, in FIG. 6A, a distance d1 between the light spot 50 formed on the diffusion component 120 by the first laser beam EB1 emitted from the first laser source module 110 located at the top and the central axis A1 of the diffusion component 120 may be different from a distance d2 between the light spot 50 formed on the diffusion component 120 by the first laser beam EB1 emitted from the first laser source module 110 located at the bottom and the central axis A1 of the diffusion component 120. In the present embodiment, the distance d1 is greater than the distance d2. In other embodiments, the distance d1 may also be less than the distance d2.

For illustrative purposes, FIG. 6B not only shows a light spot 70 formed by irradiating the plurality of first laser beams EB1 on the light-homogenizing component 170 through the convergence of the lens 186 when the distance d1 is different from the distance d2, but also specifically shows a light spot 60 (shown by dashed lines) formed by irradiating the plurality of first laser beams EB1 on the light-homogenizing component 170 through the convergence of the lens 186 when the distances between the plurality of light spots 50 and the central axis A1 of the diffusion component 120 are all the same (i.e., the distance d1 is equal to the distance d2).

Referring to FIG. 6B, in the present embodiment, when the distance d1 is different from the distance d2, the angles at which the first laser beams EB1 are deflected when passing through the lens 186 may also be different, and therefore the location of the light spot 70 on the light-homogenizing component 170 may be shifted with respect to the light spot 60. Since the plurality of first laser beams EB1 of the present embodiment are dispersedly irradiated to different locations of the diffusion component 120, by adjusting the locations of the plurality of first laser source modules 110 with respect to the central axis A1 of the diffusion component 120, the location of the light spot 70 formed by the plurality of first laser beams EB1 on the light-homogenizing component 170 may be suitably adjusted, such that the homogeneity of the illumination beam IB may be further adjusted. Therefore, the illumination system 100c of the present embodiment has a higher degree of freedom for adjusting the homogeneity of the illumination beam IB.

Figure 7A:
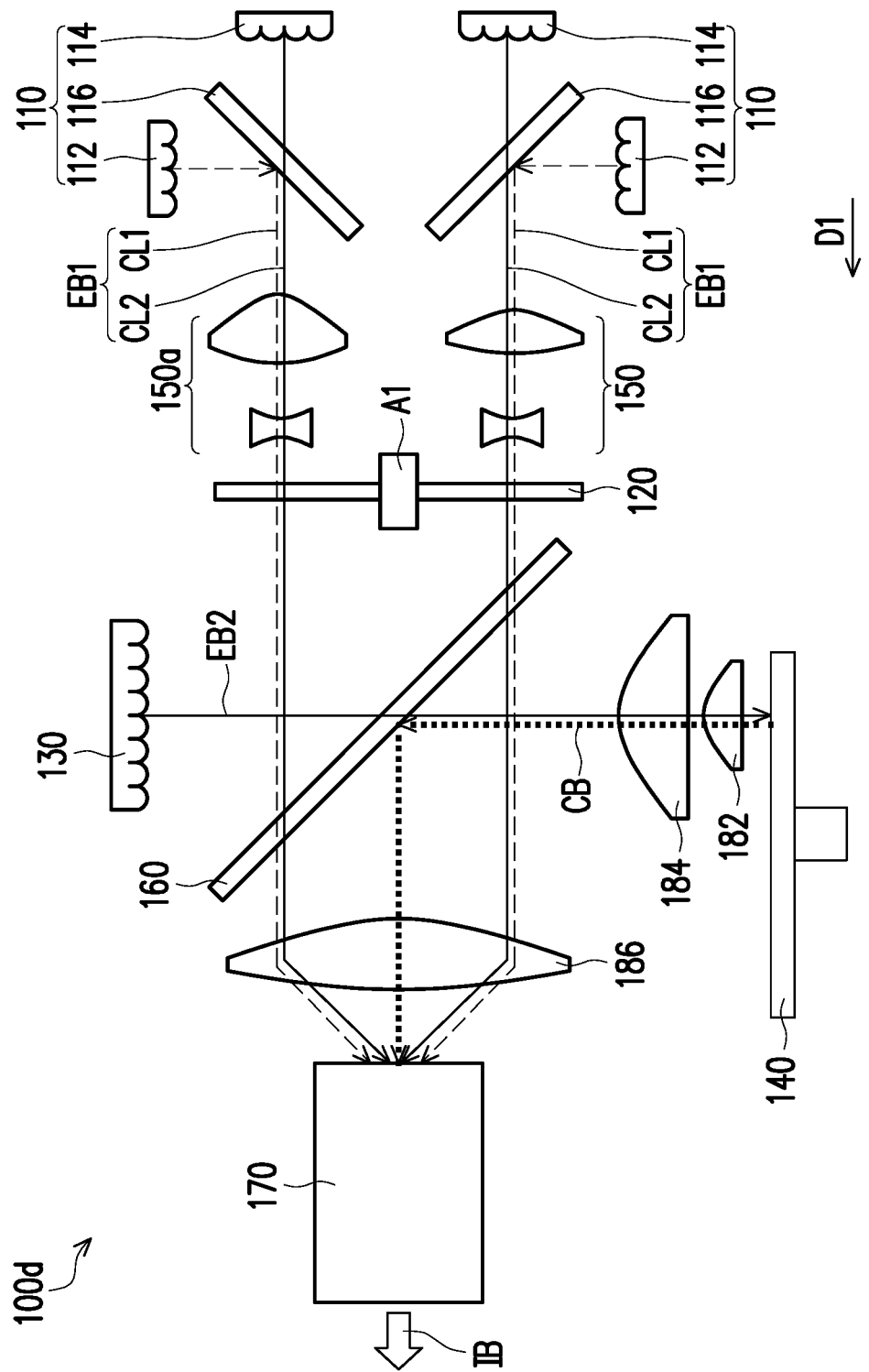
FIG. 7A is a schematic view of an illumination system according to the fourth embodiment of the invention.

FIG. 7A is a schematic view of an illumination system according to the fourth embodiment of the invention. FIG. 7B is a front view of the light-homogenizing component in FIG. 7A. In addition, FIG. 7B also schematically shows a light spot formed when a plurality of first laser beams are irradiated onto the light-homogenizing component.

Referring first to FIG. 7A, the illumination system 100d of the present embodiment is similar to the illumination system 100a of the first embodiment, and the main difference in architecture thereof is the diopters of the lens modules. In the present embodiment, at least two of the plurality of lens modules have different diopters. For example, the diopter of a lens module 150a located at the top in FIG. 7A may be different from the diopter of a lens module 150 located at the bottom in FIG. 7A.

For illustrative purposes, FIG. 7B not only shows a light spot 80 formed by irradiating the plurality of first laser beams EB1 from the lens module 150a on the light-homogenizing component 170 through the convergence of the lens 186 when the diopter of the lens module 150a is different from the diopter of the lens module 150, but also specifically shows the light spot 60 (shown by dashed lines) formed by irradiating the plurality of first laser beams EB1 from the lens module 150 on the light-homogenizing component 170 through the convergence of the lens 186 when the diopters of all of the lens modules are the same.

Referring to FIG. 7B, in the present embodiment, when the diopter of the lens module 150a is different from the diopter of the lens module 150, the opening angle of the first laser beams EB1 after passing through the lens module 150a may be different from the opening angle of the first laser beams EB1 after passing through the lens module 150, and therefore the location of the light spot 80 with respect to the light spot 60 on the light-homogenizing component 170 may be shifted, and the size of the light spot 80 may be changed.

Since the plurality of first laser beams EB1 of the present embodiment are dispersedly irradiated to different locations of the diffusion component 120, by adjusting the diopter of the lens module 150a, the location and size of the light spot 80 formed by the plurality of first laser beams EB1 on the light-homogenizing component 170 may be suitably adjusted, such that the homogeneity of the illumination beam IB may be further adjusted. Therefore, the illumination system 100d of the present embodiment has a higher degree of freedom for adjusting the homogeneity of the illumination beam IB.

Figure 8:
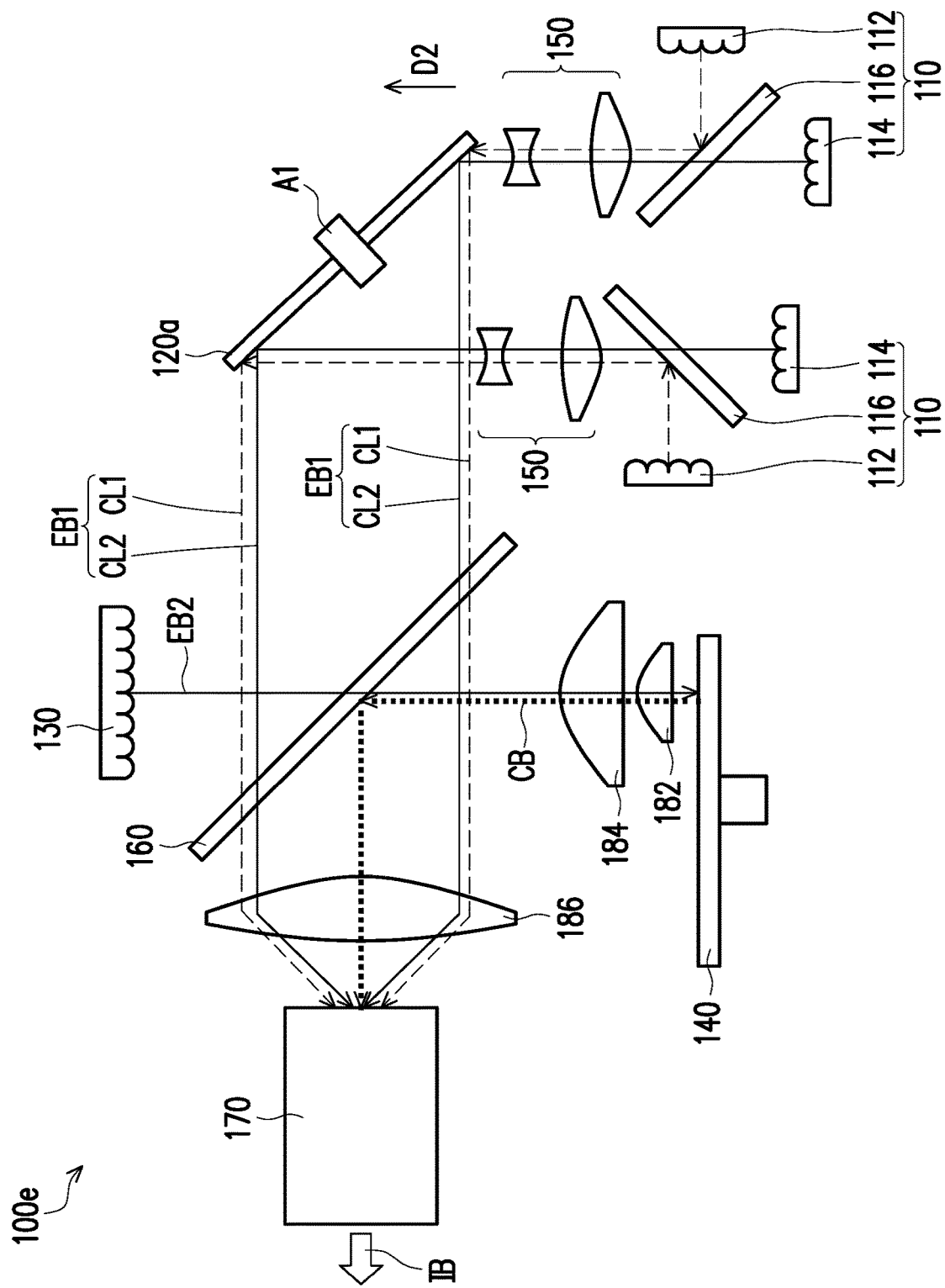
FIG. 8 is a schematic view of an illumination system according to the fifth embodiment of the invention.

FIG. 8 is a schematic view of an illumination system according to the fifth embodiment of the invention. Referring to FIG. 8, the illumination system 100e of the present embodiment is similar to the illumination system 100a of the first embodiment, and the main difference in architecture thereof is that the substrate S1 of the diffusion component 120 of the first embodiment is a light-transmitting substrate, and the substrate S1 of the diffusion component 120a of the present embodiment is a reflective substrate, and the plurality of first laser source modules 110 and the wavelength conversion component 140 of the present embodiment are disposed at the same side of the diffusion component 120a.

Since the substrate S1 of the diffusion component 120a of the present embodiment is a reflective substrate, traveling directions D2 (e.g. direction from bottom to top in FIG. 8) of the plurality of first laser beams EB1 incident to the diffusion component 120a may be correspondingly turned, and therefore the plurality of first laser source modules 110 and the wavelength conversion component 140 may be disposed at the same side of the diffusion component 120a, and the plurality of first laser beams EB1 may be reflected to the light-combining component 160 by the substrate S1 of the diffusion component 120a after the plurality of first laser beams EB1 are transmitted to the diffusion component 120a.

Since the plurality of first laser source modules 110 and the wavelength conversion component 140 of the present embodiment may be disposed at the same side of the diffusion component 120a, the heat dissipation modules (not shown) of the plurality of first laser source modules 110 and the wavelength conversion component 140 may also be disposed at the same side for heat dissipation, which is conducive to the design of heat flow.

Figure 9:
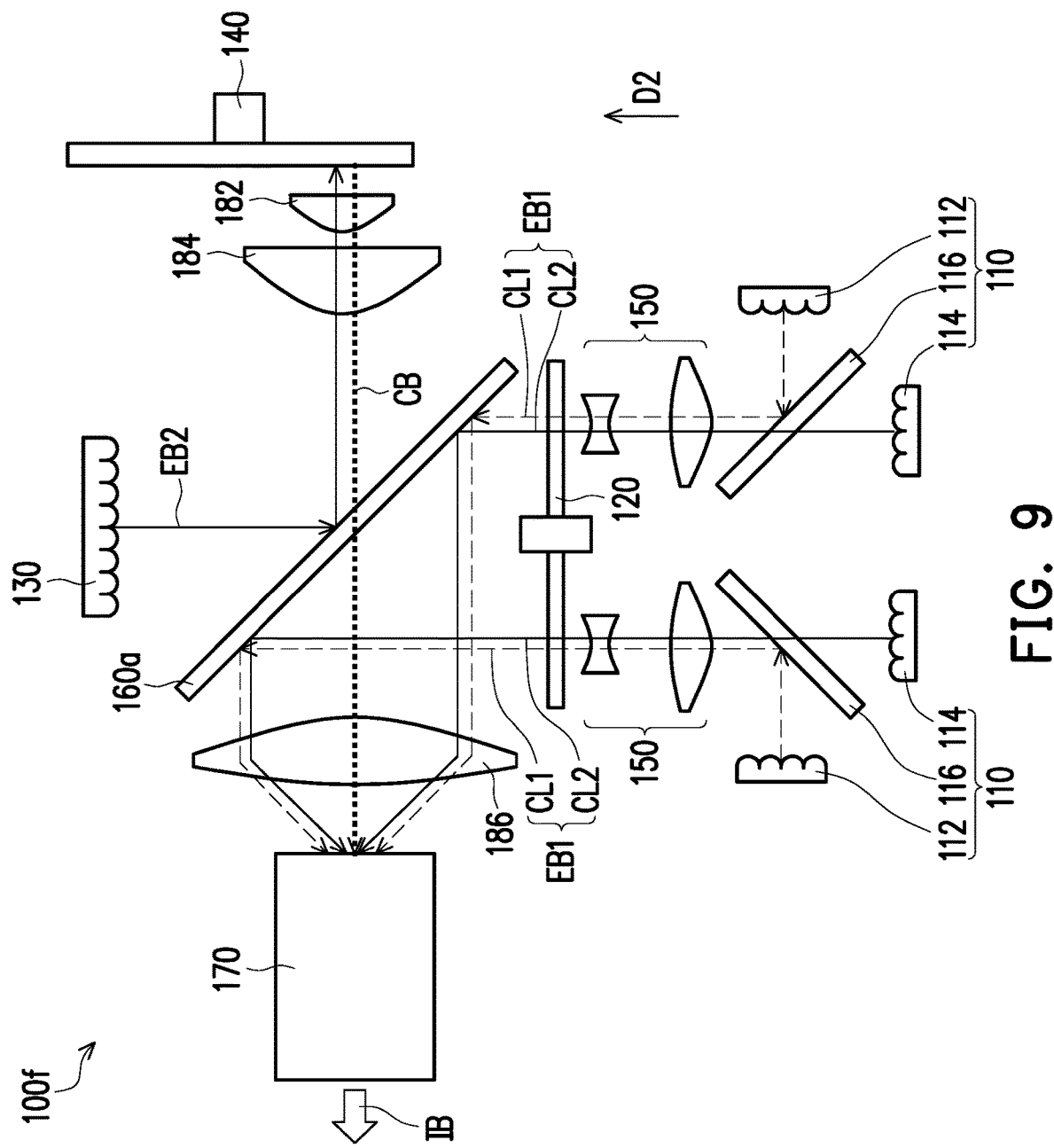
FIG. 9 is a schematic view of an illumination system according to the sixth embodiment of the invention.

FIG. 9 is a schematic view of an illumination system according to the sixth embodiment of the invention. Referring to FIG. 9, the illumination system 100f of the present embodiment is similar to the illumination system 100a of the first embodiment, and the main difference in architecture thereof is that compared to the plurality of first laser source modules 110 and the wavelength conversion component 140 of the first embodiment, the locations of the plurality of first laser source modules 110 and the wavelength conversion component 140 of the present embodiment are exchanged, such that the illumination system 100f of the present embodiment is smaller in the lateral direction.

In detail, in the present embodiment, a light-combining component 160a may be designed to allow the converted beam CB to pass through and reflect the first laser beams EB1 and the second laser beam EB2. Therefore, the light-combining component 160a may transmit (reflect) the second laser beam EB2 from the second laser source module 130 to the wavelength conversion component 140, and after the wavelength conversion component 140 reflects the converted beam CB back to the light-combining component 160a, the light-combining component 160a may combine the converted beam CB from the wavelength conversion component 140 and the first laser beams EB1 from the first laser source modules 110 and transmit the them to the light-homogenizing component 170 to form the illumination beam IB for output.

Since the locations of the plurality of first laser source modules 110 and the wavelength conversion component 140 are exchanged, the light-combining component 160a of the present embodiment is disposed between the plurality of first laser source modules 110 and the second laser source module 130, and is disposed between the wavelength conversion component 140 and the light-homogenizing component 170.

Figure 10:
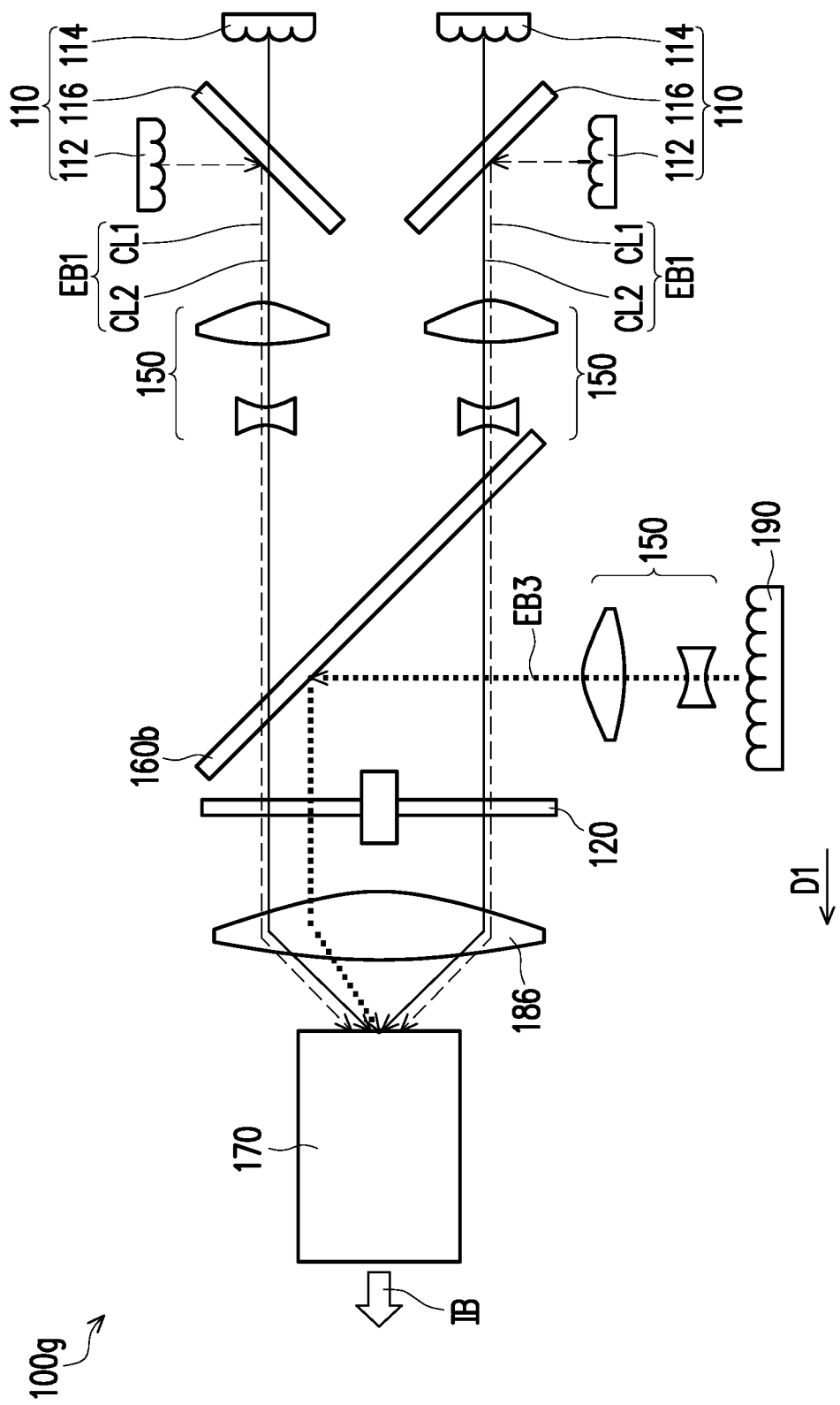
FIG. 10 is a schematic view of an illumination system according to the seventh embodiment of the invention.

FIG. 10 is a schematic view of an illumination system according to the seventh embodiment of the invention. Referring to FIG. 10, the illumination system 100g of the present embodiment is similar to the illumination system 100a of the first embodiment, and the main difference in architecture thereof is that the illumination system 100g of the present embodiment includes a third laser source module 190 and does not have the second laser source module 130 and the wavelength conversion component 140 of the illumination system 100a. In the present embodiment, the third laser source module 190 is adapted to emit a third laser beam EB3. The third laser source module 190 may be, for example, a green laser diode bank, and the third laser beam EB3 is a green laser beam. That is to say, the illumination system 100g of the present embodiment directly adopts three different color laser beams as the color beams required for the illumination beam IB instead of converting different color beams through the wavelength conversion component.

In addition, in the present embodiment, a light-combining component 160b is disposed between the diffusion component 120 and the plurality of first laser source modules 110, and the light-combining component 160b may be designed to allow the first laser beams EB1 pass through and reflect the third laser beam EB3. Therefore, the light-combining component 160b may transmit the plurality of first laser beams EB1 from the plurality of first laser source modules 110 to the diffusion component 120, and may also transmit the third laser beam EB3 from the third laser source module 190 to the diffusion component 120, such that the plurality of first laser beams EB1 and the third laser beam EB3 respectively form a plurality of light spots at different locations of the diffusion component 120, and are then converged to the light-homogenizing component 170 through the lens 186 to form the illumination beam IB for output.

The number of the third laser source module 190 of the present embodiment is exemplified by one. However, in other embodiments, the number of the third laser source module 190 may be more than one, and a plurality of the third laser beams EB3 emitted from the plurality of third laser source modules 190 respectively form a plurality of light spots at different locations of the diffusion component 120.

It should be noted that the configuration of the plurality of first laser source modules 110 of the illumination systems of the third embodiment to seventh embodiment of the invention are exemplified by the plurality of first laser source modules 110 of the illumination system 100a of the first embodiment. However, the plurality of first laser source modules 110a of the illumination system 100b of the second embodiment may be adopted as the plurality of first laser source modules 110 of the illumination systems of the third embodiment to seventh embodiment, and the invention is not limited thereto. Further, when the plurality of first laser source modules 110a of the illumination system 100b of the second embodiment are adopted as the plurality of first laser source modules 110 of the illumination system 100g of the seventh embodiment of the invention, the third laser source module 190 of the illumination system 100g may be disposed beside the first laser sources 112 and the second laser sources 114 such that the third laser beam EB3 is directly irradiated on the diffusion component 120. Therefore, it is not necessary to provide the light-combining component 160 to combine the plurality of beams of different paths.

Based on the above, in the illumination system of an embodiment of the invention, the illumination system includes a plurality of first laser source modules, and the plurality of first laser beams emitted from the plurality of first laser source modules form a plurality of light spots at a plurality of locations on the diffusion component. That is to say, by separately disposing the plurality of first laser source modules, the plurality of first laser beams are not concentratedly irradiated to the same location of the diffusion component, so that a larger lens is not required to converge the plurality of first laser beams to the same location, and the optical path may be reduced, so that a smaller size may be achieved. In addition, the plurality of first laser beams are dispersedly irradiated to different locations of the diffusion component, which may reduce the energy density on the diffusion component to avoid burning the diffusion component, and thus a longer service life may be achieved.

In addition, since the plurality of first laser beams are dispersedly irradiated to different locations of the diffusion component, by adjusting the locations of the plurality of first laser source modules with respect to the central axis of the diffusion component or by adjusting the diopters of the lens modules, the size or location of the light spot formed by the plurality of first laser beams on the light-homogenizing component may be suitably adjusted to further adjust the homogeneity of the illumination beam. Therefore, the illumination system of the present embodiment has a higher degree of freedom for adjusting the homogeneity of the illumination beam. The projection apparatus of the embodiment of the invention includes the illumination system above, and therefore has a small size, a longer service life, and a higher degree of freedom to adjust the homogeneity of the illumination beam.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, wherein the illumination system comprises a plurality of first laser source modules and a diffusion component, wherein:
   the plurality of first laser source modules are adapted to emit a plurality of first laser beams; and
   the diffusion component is disposed on transmission paths of the plurality of first laser beams for reducing speckle phenomenon of the first laser beams, wherein the plurality of first laser beams form a plurality of light spots at a plurality of locations on the diffusion component, and the diffusion component comprises a central axis and a rotatable disk-shaped component rotating around the central axis.

2. The illumination system of claim 1, wherein traveling directions of the plurality of first laser beams are parallel to each other when the plurality of first laser beams are incident to the diffusion component.

3. The illumination system of claim 1, wherein the plurality of first laser source modules comprise:
   at least one first laser source, adapted to emit at least one first color beam; and
   at least one second laser source, adapted to emit at least one second color beam, wherein the plurality of first laser beams comprise the at least one first color beam and the at least one second color beam.

4. The illumination system of claim 1, wherein the plurality of first laser source modules are arranged in a ring shape, such that the plurality of light spots are arranged in a ring shape.

5. The illumination system of claim 1, wherein at least two of the plurality of light spots are at different distances from a central axis of the diffusion component.

6. The illumination system of claim 1, further comprising a plurality of lens modules, wherein the plurality of lens modules are respectively disposed on the transmission paths of the plurality of first laser beams, wherein at least two of the plurality of lens modules have different diopters.

7. The illumination system of claim 1, wherein each of the first laser source modules comprises:
   a first laser source, adapted to emit a first color beam;
   a second laser source, adapted to emit a second color beam; and
   a light-combining unit, disposed on transmission paths of the first color beam and the second color beam, and the light-combining unit combining the first color beam and the second color beam into one of the plurality of first laser beams.

8. The illumination system of claim 7, wherein the first laser source and the second laser source are disposed at two opposite sides of the light-combining unit.

9. A projection apparatus, wherein the projection apparatus comprises an illumination system, a light valve module, and a projection lens, wherein:
   the illumination system is adapted to emit an illumination beam, and the illumination system comprises a plurality of first laser source modules and a diffusion component, wherein:
      the plurality of first laser source modules are adapted to emit a plurality of first laser beams; and
      the diffusion component is disposed on transmission paths of the plurality of first laser beams for reducing speckle phenomenon of the first laser beams, wherein the plurality of first laser beams form a plurality of light spots at a plurality of locations on the diffusion component, wherein the diffusion component comprises a central axis and a rotatable disk-shaped component rotating around the central axis;
   the light valve module is disposed on a transmission path of the illumination beam to modulate the illumination beam into an image beam; and
   the projection lens is disposed on a transmission path of the image beam.

10. The projection apparatus of claim 9, wherein traveling directions of the plurality of first laser beams are parallel to each other when the plurality of first laser beams are incident to the diffusion component.

11. The projection apparatus of claim 9, wherein each of the first laser source modules comprises:
   a first laser source, adapted to emit a first color beam;
   a second laser source, adapted to emit a second color beam; and
   a light-combining unit, disposed on transmission paths of the first color beam and the second color beam, and the light-combining unit combining the first color beam and the second color beam into one of the plurality of first laser beams.

12. The projection apparatus of claim 9, wherein the plurality of first laser source modules comprise:
   at least one first laser source, adapted to emit at least one first color beam; and
   at least one second laser source, adapted to emit at least one second color beam, wherein the plurality of first laser beams comprise the at least one first color beam and the at least one second color beam.

13. The projection apparatus of claim 9, wherein the plurality of first laser source modules are arranged in a ring shape, such that the plurality of light spots are arranged in a ring shape.

14. The projection apparatus of claim 9, wherein at least two of the plurality of light spots are at different distances from a central axis of the diffusion component.

15. The projection apparatus of claim 9, wherein the illumination system further comprises a plurality of lens modules, wherein the plurality of lens modules are respectively disposed on the transmission paths of the plurality of first laser beams, wherein at least two of the plurality of lens modules have different diopters.

16. An illumination system, comprising:
   a plurality of first laser source modules, adapted to emit a plurality of first laser beams;
   a diffusion component, disposed on transmission paths of the plurality of first laser beams, wherein the plurality of first laser beams form a plurality of light spots at a plurality of locations on the diffusion component;
   a second laser source module, adapted to emit a second laser beam; and
   a wavelength conversion component, disposed on a transmission path of the second laser beam, wherein the wavelength conversion component is adapted to convert the second laser beam into a converted beam.

17. The illumination system of claim 16, wherein the plurality of first laser source modules and the wavelength conversion component are disposed at a same side of the diffusion component.

18. The illumination system of claim 16, wherein the illumination system further comprises a light-combining component, and the light-combining component is disposed on a transmission path of the second laser beam from the second laser source module, the converted beam from the wavelength conversion component and the plurality of first laser beams from the diffusion component, wherein the light-combining component transmits the second laser beam to the wavelength conversion component, and the light-combining component combines the converted beam from the wavelength conversion component and the plurality of first laser beams from the diffusion component.

19. The illumination system of claim 18, wherein the illumination system further comprises a light-homogenizing component, and the light-homogenizing component is disposed on the transmission paths of the converted beam and the plurality of first laser beams from the light-combining component.

20. A projection apparatus, wherein the projection apparatus comprises an illumination system, a light valve module, and a projection lens, wherein:
the illumination system is adapted to emit an illumination beam, and the illumination system comprises a plurality of first laser source modules and a diffusion component, wherein:
the plurality of first laser source modules are adapted to emit a plurality of first laser beams; and
the diffusion component is disposed on transmission paths of the plurality of first laser beams, wherein the plurality of first laser beams form a plurality of light spots at a plurality of locations on the diffusion component;
the light valve module is disposed on a transmission path of the illumination beam to modulate the illumination beam into an image beam; and
the projection lens is disposed on a transmission path of the image beam,
wherein the illumination system further comprises:
a second laser source module, adapted to emit a second laser beam; and
a wavelength conversion component, disposed on a transmission path of the second laser beam, wherein the wavelength conversion component is adapted to convert the second laser beam into a converted beam.

21. The projection apparatus of claim 20, wherein the plurality of first laser source modules and the wavelength conversion component are disposed at a same side of the diffusion component.

22. An illumination system, wherein the illumination system comprises a plurality of first laser source modules and a diffusion component, wherein:
the plurality of first laser source modules are adapted to emit a plurality of first laser beams; and
the diffusion component is disposed on transmission paths of the plurality of first laser beams, wherein the plurality of first laser beams form a plurality of light spots at a plurality of locations on the diffusion component,
wherein the diffusion component has a central axis, and the diffusion component is adapted to rotate around the central axis.

23. A projection apparatus, wherein the projection apparatus comprises an illumination system, a light valve module, and a projection lens, wherein:
the illumination system is adapted to emit an illumination beam, and the illumination system comprises a plurality of first laser source modules and a diffusion component, wherein:
the plurality of first laser source modules are adapted to emit a plurality of first laser beams; and
the diffusion component is disposed on transmission paths of the plurality of first laser beams, wherein the plurality of first laser beams form a plurality of light spots at a plurality of locations on the diffusion component;
the light valve module is disposed on a transmission path of the illumination beam to modulate the illumination beam into an image beam; and
the projection lens is disposed on a transmission path of the image beam,
wherein the diffusion component has a central axis, and the diffusion component is adapted to rotate around the central axis.

* * * * *